United States Patent [19]
Mayer et al.

[11] Patent Number: 5,601,938
[45] Date of Patent: Feb. 11, 1997

[54] CARBON AEROGEL ELECTRODES FOR DIRECT ENERGY CONVERSION

[75] Inventors: Steven T. Mayer, San Leandro; James L. Kaschmitter, Pleasanton; Richard W. Pekala, Pleasant Hill, all of Calif.

[73] Assignee: Regents of the University of California, Oakland, Calif.

[21] Appl. No.: 183,876

[22] Filed: Jan. 21, 1994

[51] Int. Cl.$^6$ ............................................. H01M 4/96
[52] U.S. Cl. .................. 429/40; 429/46; 502/402; 502/416
[58] Field of Search .................... 429/40–42, 44, 429/45, 46, 218; 502/402, 416, 439, 418, 437

[56] References Cited

U.S. PATENT DOCUMENTS

| | | | |
|---|---|---|---|
| 4,806,290 | 2/1989 | Hopper et al. | 264/28 |
| 4,818,640 | 4/1989 | Fukuda et al. | 429/40 X |
| 4,873,218 | 10/1989 | Pekala | 502/418 |
| 4,997,804 | 3/1991 | Pekala | 502/418 |
| 5,260,855 | 11/1993 | Kaschmitter et al. | 361/502 |
| 5,266,177 | 11/1993 | Watanabe et al. | 429/40 X |

Primary Examiner—Anthony Skapars
Attorney, Agent, or Firm—L. E. Carnahan; Henry P. Sartorio

[57] ABSTRACT

A direct energy conversion device, such as a fuel cell, using carbon aerogel electrodes, wherein the carbon aerogel is loaded with a noble catalyst, such as platinum or rhodium and soaked with phosphoric acid, for example. A separator is located between the electrodes, which are placed in a cylinder having plate current collectors positioned adjacent the electrodes and connected to a power supply, and a pair of gas manifolds, containing hydrogen and oxygen positioned adjacent the current collectors. Due to the high surface area and excellent electrical conductivity of carbon aerogels, the problems relative to high polarization resistance of carbon composite electrodes conventionally used in fuel cells are overcome.

19 Claims, 1 Drawing Sheet

U.S. Patent      Feb. 11, 1997      5,601,938
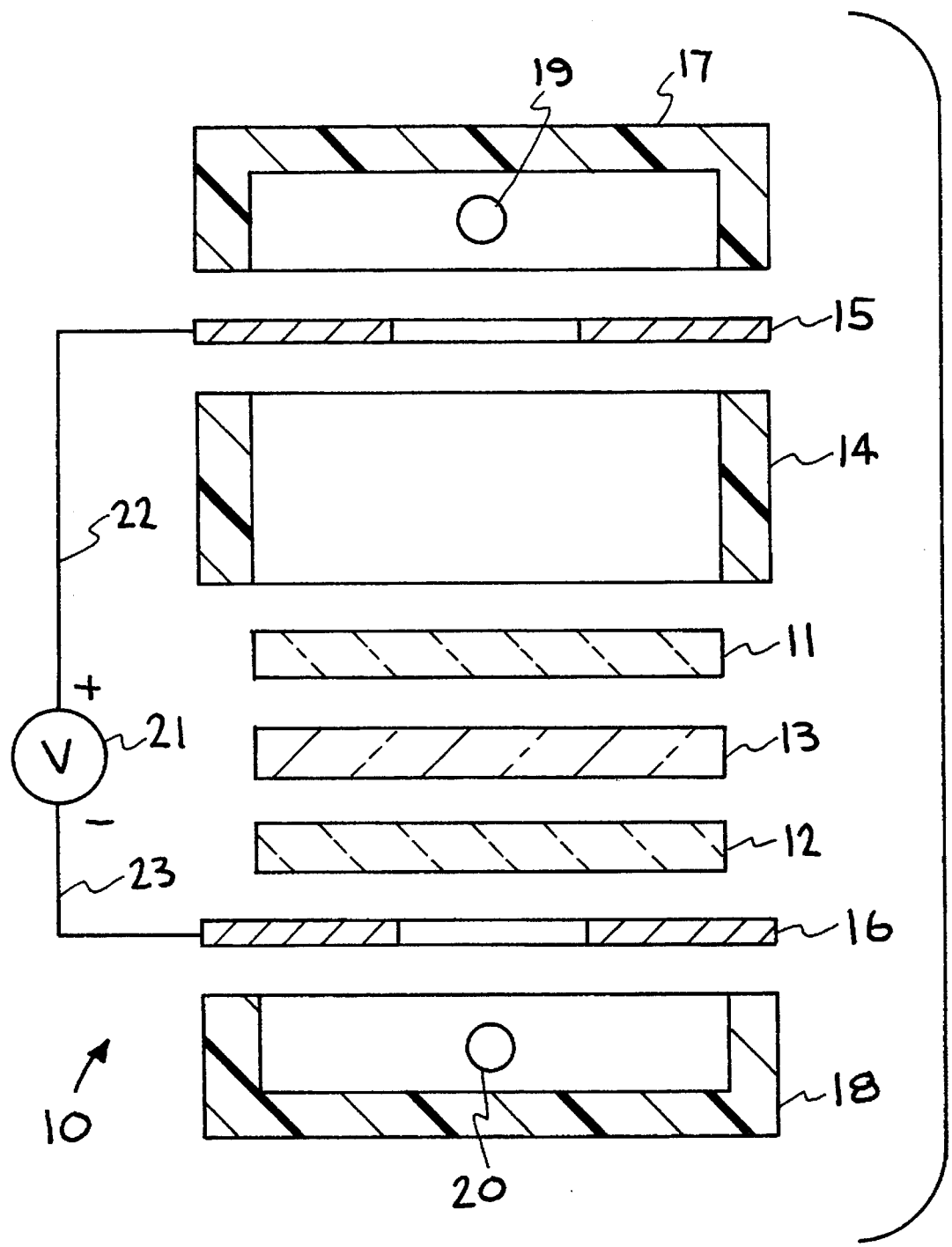

CARBON AEROGEL ELECTRODES FOR DIRECT ENERGY CONVERSION

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to direct energy conversion devices, particularly to the use of carbon aerogel electrodes in direct energy conversion devices, and more particularly to a fuel cell using carbon aerogel electrodes loaded with a noble catalyst such as platinum, and soaked with phosphoric acid, for example.

Direct energy conversion devices, such as fuel cells, typically use carbon composite electrodes, impregnated with platinum, rhodium, or other noble catalyst. These electrodes suffer from high polarization resistance, resulting in limited power capability. The problem associated with high polarization resistance is largely due to the rate limiting catalysis of the oxygen reduction reaction. Catalysis reaction rates are proportional to the surface area of the electrodes. A need exists to provide electrodes for fuel cells which reduce or eliminate the above problem.

Carbon aerogels are recognized as having high surface areas and excellent electrical conductivity, and can be fabricated with widely varying physical characteristics, as described and claimed in U.S. Pat. No. 5,260,855 issued Nov. 9, 1993, entitled "Supercapacitors Based On Carbon Foams". Other carbon aerogels are known, as exemplified by U.S. Pat. Nos. 4,806,290, 4,873,218 and 4,997,804.

It has been recognized that the problems relative to high polarization resistances of carbon composite electrodes used in fuel cells can be overcome by using carbon aerogel electrodes loaded with a noble catalyst, provided the carbon aerogel has a reactant/catalyst (R/C) ratio of about 50–400, and with a density of about 0.3 to 1.2 g/cc and surface area of about 400–1200 $m^2/g$. Thus, due to the very high surface areas and electrical conductivity of carbon aerogels, the present invention satisfies the above-mentioned need for improved electrodes for fuel cells.

SUMMARY OF THE INVENTION

It is an object of the present invention to provide carbon aerogel electrodes for use in direct energy conversion devices.

A further object of the invention is to provide an improved fuel cell using carbon aerogel electrodes.

Another object of the invention is to provide a fuel cell which incorporates carbon aerogel electrodes loaded with a noble catalyst.

Another object of the invention is to provide platinum loaded carbon aerogel electrodes having a reactant/catalyst ratio of about 50–400, a density of about 0.3–1.2 g/cc, and a surface area of about 400–1200 $m^2/g$.

Other objects and advantages of the present invention will become apparent from the following description and accompanying drawing. Basically, the invention is directed to a carbon aerogel electrode for use in energy conversion devices, such as fuel cells. More specifically, the invention involves a carbon aerogel electrode loaded with platinum and produced from an aerogel having a reactant/catalyst ratio of about 50–400. The density of the carbon aerogel electrode is in the 0.3–1.2 g/cc range and the surface area is about 400–1200 $m^2/g$.

BRIEF DESCRIPTION OF THE DRAWINGS

The accompanying drawing, which is incorporated into and forms a part of the disclosure, illustrates an embodiment of the invention and, together with the description, serves to explain the principles of the invention.

The single figure is an exploded view of an embodiment of a fuel cell incorporating carbon aerogel electrodes pursuant to the present invention.

DETAILED DESCRIPTION OF THE INVENTION

The invention is directed to carbon aerogel electrodes for direct energy conversion devices, such as a fuel cell. Fuel cells are being developed for numerous uses, including electric vehicles, space power, remote power source, utility load leveling, etc. Prior fuel cell have had limited power capability due to the use of carbon composite electrodes therein which suffer from high polarization resistance, which is largely due to the rate limiting catalysis of the oxygen reduction reaction, which reaction rates are proportional to surface area. Thus, electrodes which have high surface areas, such as carbon electrodes, make ideal fuel cell electrodes, particularly since such carbon aerogels also have excellent electrical conductivity. Carbon aerogel electrodes can also be fabricated with widely varying, tailored physical characteristics, as well as having metals, activated carbons, and mixed metal oxides loaded into the carbon aerogel's matrix.

An embodiment of a fuel cell incorporating carbon aerogel electrodes which was fabricated for experimental verification is illustrated in the drawing. The illustrated fuel cell generally indicated at 10 includes a pair of platinum loaded carbon aerogel electrodes 11 and 12 separated by a microporous glass separator 13, with the electrode 11 being the oxygen electrode and electrode 12 being the hydrogen electrode. The electrodes and separator are soaked with phosphoric acid and then placed in a polypropylene cylinder or housing 14. A pair of titanium plate current collectors 15 and 16 for the positive (oxygen) and negative (hydrogen) electrodes 11 and 12, respectively, are positioned intermediate the cylinder 14 and a pair of gas manifolds 17 and 18, one for each reactant, oxygen and hydrogen. The manifolds 17 and 18 are connected to reactant supplies, not shown, via respective openings 19 and 20 therein. The current collector plates 15 and 16 are connected to a power source 21 via electrical leads 22 and 23, respectively. The assembly (elements 11–18) may be held together by compressive force, bonding, etc.

The carbon aerogel electrodes may be made by the procedures of the above-referenced patents and patent application, which are herein incorporated by reference. Also, U.S. Application Ser. No. 08/041,507, filed Apr. 1, 1993 entitled "Doping Of Carbon Foams For Use In Energy Storage Devices", now U.S. Pat. No. 5,358,802 issued Oct. 25, 1994, assigned to the same assignee, is directed to producing doped carbon aerogels during the formation of the aerogel prior to carbonization thereof, and is herein incorporated by reference.

The carbon aerogels of the above-described embodiment of this invention are loaded or doped with a noble catalyst, such as platinum, rhodium, palladium, and iridium, and formed using a reactant weight composition of 40% and a reactant/catalyst (R/C) ratio of 200, with a density of about 0.57 g/cc. This embodiment utilizes carbon aerogel electrodes loaded or doped with platinum, with the platinum used therein being loaded to 5–10 weight percent, highly dispersed with particle sizes less than or equal to 1 micron. The platinum loading for the oxygen electrode could be considerably greater than that of the hydrogen electrode, but in this initial test embodiment the platinum loading was the same in both electrodes with the electrode sizes being different, and electrical energy was produced thereby.

Generally, the same platinum loading is used for both electrodes, and the electrode size is varied to get balance. Loading may be 0.04–0.4 g/sq cm for both electrodes. The reaction rate is higher for hydrogen by a factor of 5–10 times. Very high platinum loading (10–30 weight percent) has been used, but this is too expensive for commercial use. Also, platinum has been mixed with iridium for methanol systems.

In the fabrication of the above-described embodiment, commercially available platinum black (0.2–0.5 micron particle size) was dispersed ultrasonically in an aqueous solution, which was added to an appropriate mixture of resorcinol-formaldehyde (RF) sol, cured at 50°–100° C. to form a gel which was then fired at 600°–2000° C., pursuant to the process of the prior referenced patents and applications.

As an alternative, a platinum colloid (which has a smaller platinum particle size) could be used, which is then used in a RF sol as described above.

While the electrode separator is described above as being made of microporous glass, it can be made of other conventional separator materials, such as Nafion and Dowex, made by the Dow Chemical Company, or from aquagel as described and claimed in U.S. application Ser. No. 08/057,739, filed May 4, 1993 now U.S. Pat. No. 5,402,306, entitled "An Aquagel Separator For Use In Batteries And Supercapacitors", and assigned to the same assignee, and which is herein incorporated by reference.

It has thus been shown that the present invention provides an improved direct energy conversion device which overcomes the problems associated with carbon composite electrodes, by utilizing carbon aerogel electrodes which provide both high surface area and electrical conductivity. Thus, direct energy conversion devices, such as fuel cells, may be efficiently utilized without the limited power capability of the prior known devices.

While a particular embodiment of the invention has been illustrated and described, other parameters, materials, etc. may be utilized therein, as well as other applications for the electrodes. Thus, the specific embodiment is not intended to limit the invention. Modifications and changes will become apparent to those skilled in the art, and the invention is to be limited only by the scope of the appended claims.

We claim:

1. In a direct energy conversion device, the improvement comprising:

at least one pair of carbon aerogel electrodes;

said electrodes being loaded with a noble catalyst.

2. The improvement of claim 1, wherein said noble catalyst is selected from the group of platinum, palladium, iridium, and rhodium.

3. The improvement of claim 2, wherein said noble catalyst is platinum.

4. The improvement of claim 1, wherein said carbon aerogel electrodes are fabricated using a reactant weight composition of 40% and a reactant/catalyst ratio of 200, and wherein said carbon aerogel electrodes are loaded with platinum and have a density of about 0.57 g/cc.

5. The improvement of claim 1, wherein said carbon aerogel electrodes have a density of about 0.3–1.2 g/cc;

a surface area of about 400–1200 $m^2/g$; and a reactant/catalyst ratio of about 50–400.

6. A carbon aerogel electrode for use in a direct energy conversion device having a density of 0.3–1.2 g/cc, a surface area of 400–1200 $m^2/g$, and loaded with a noble catalyst.

7. The carbon aerogel electrode of claim 6, wherein said noble catalyst is selected from platinum, palladium, iridium, and rhodium.

8. The carbon aerogel electrode of claim 7, additionally having a reactant/catalyst ratio of about 50–400.

9. The carbon aerogel electrode of claim 6, wherein said noble catalyst is in the range of 5 to 10 weight percent.

10. An improved fuel cell including:

a pair of carbon aerogel electrodes;

a separator positioned intermediate said electrodes;

said electrodes and said separator being located within a housing;

a pair of current collector plates positioned adjacent said electrodes; and a pair of gas manifolds positioned adjacent said current collector plates.

11. The improved fuel cell of claim 10, wherein at least said pair of electrodes are soaked with phosphoric acid.

12. The improved fuel cell of claim 10, wherein said pair of electrodes are loaded with a noble catalyst selected from the group consisting of platinum, rhodium, palladium, and iridium.

13. The improved fuel cell of claim 12, wherein said electrodes have a density in the range of 0.3 to 1.2 g/cc.

14. The improved fuel cell of claim 13, wherein said electrodes have a surface area of about 400–1200 $m^2/g$.

15. The improved fuel cell of claim 14, wherein said separator is constructed from material selected from the group of microporous glass and aquagels.

16. The improved fuel cell of claim 10, wherein said pair of carbon aerogel electrodes are loaded with platinum, and are formed from an aerogel wherein the reactant weight composition is 40%, the reactant/catalyst ratio is 200, and wherein the carbon aerogel has a density of about 0.57 g/cc.

17. The improved fuel cell of claim 16, wherein at least said pair of electrodes are soaked with phosphoric acid.

18. The improved fuel cell of claim 12, wherein the electrodes are loaded with platinum particles to 5–10 weight percent, with particle sizes less than about 1 micron.

19. The improved fuel cell of claim 18, wherein the platinum loading is about 0.04 to 0.4 g/sq cm.

\* \* \* \* \*